Jan. 12, 1943.  R. M. MAGNUSON  2,308,190
CHERRY CANDLER
Filed Aug. 29, 1941  3 Sheets-Sheet 1
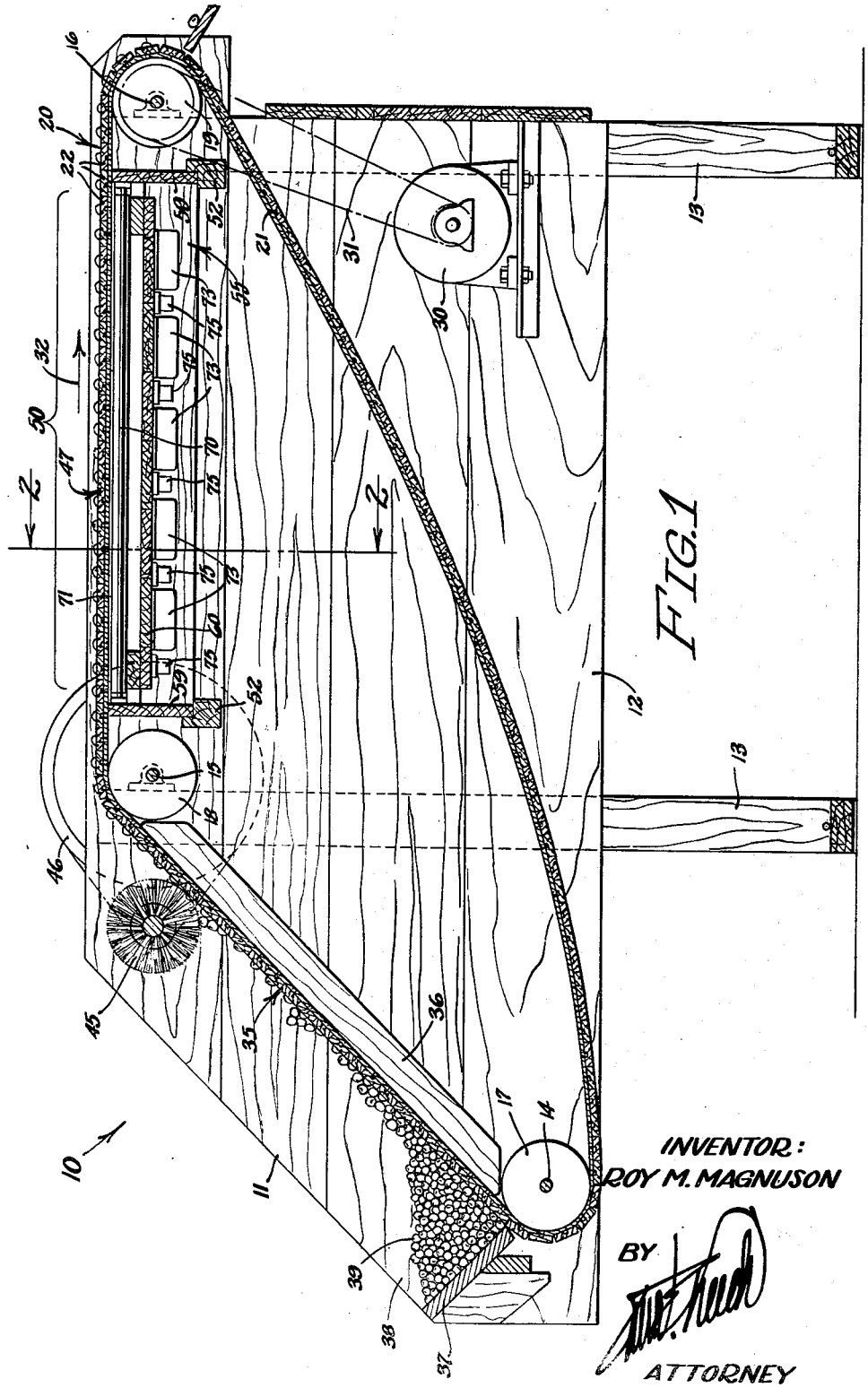
INVENTOR:
ROY M. MAGNUSON
BY
ATTORNEY Jan. 12, 1943.  R. M. MAGNUSON  2,308,190
CHERRY CANDLER
Filed Aug. 29, 1941  3 Sheets-Sheet 2
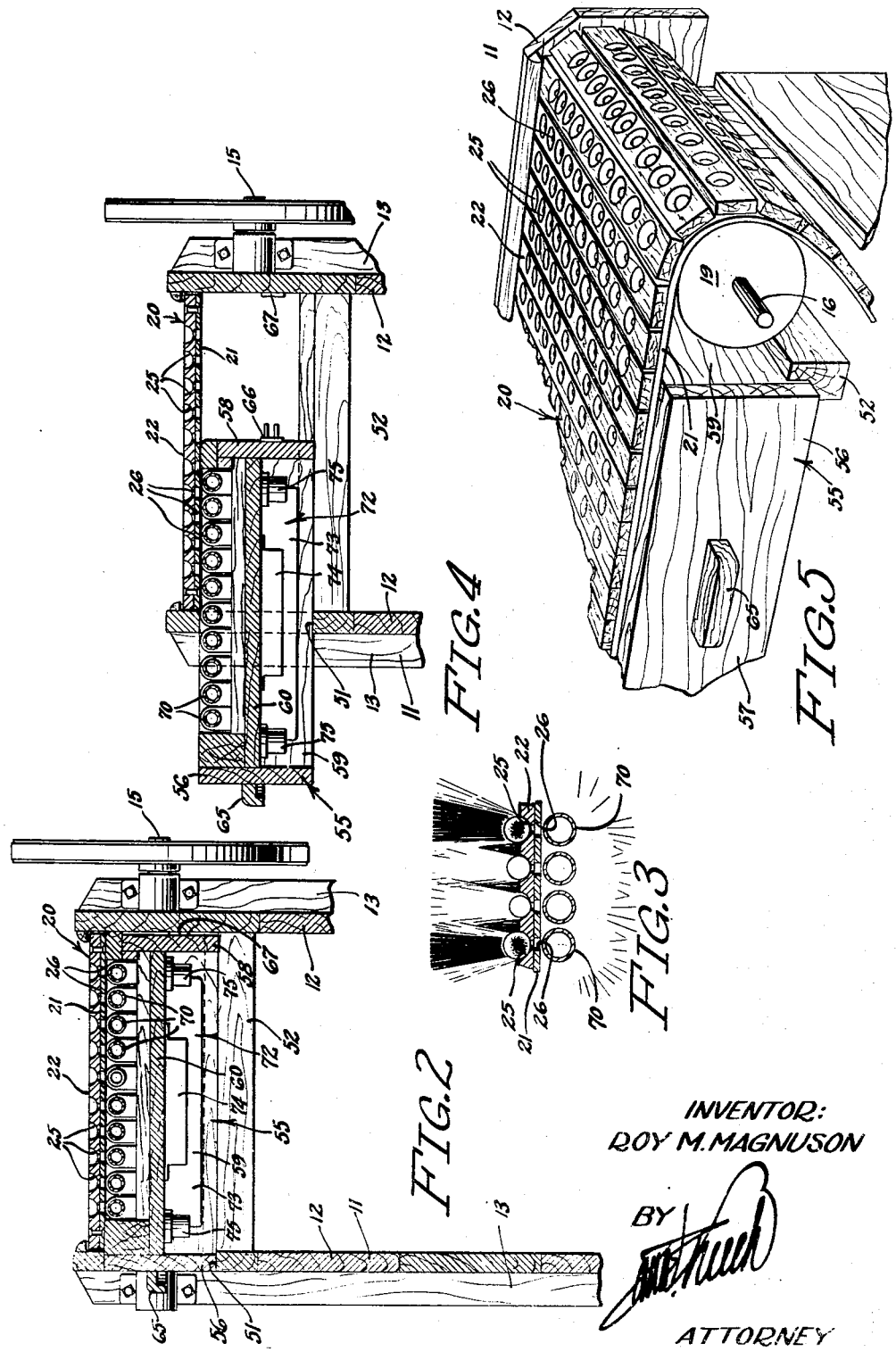
INVENTOR:
ROY M. MAGNUSON
BY
ATTORNEY Jan. 12, 1943.     R. M. MAGNUSON     2,308,190
CHERRY CANDLER
Filed Aug. 29, 1941     3 Sheets-Sheet 3

INVENTOR:
ROY M. MAGNUSON
BY
ATTORNEY

Patented Jan. 12, 1943

2,308,190

UNITED STATES PATENT OFFICE 2,308,190

CHERRY CANDLER

Roy M. Magnuson, Campbell, Calif., assignor to Food Machinery Corporation, San Jose, Calif., a corporation of Delaware Application August 29, 1941, Serial No. 408,751

6 Claims. (Cl. 88—14)

This invention relates to the candling art in which articles are compared and segregated in accordance with the amount of light passing therethrough.

The primary processing of maraschino cherries causes these to become thoroughly bleached, after which they are pitted and then further treated as by leaching, syruping and coloring before they are bottled for marketing.

Wherever cherries are sold with the understanding that they have been pitted, it is very important to the manufacturer to be certain that all the pits have been removed before these are bottled or canned, as the presence of a single unpitted cherry in a package sold as having been pitted may become the basis of a damage suit.

It is the object of my invention to provide an efficient candling machine having a relatively large capacity and which is suitable for testing pitted maraschino cherries and segregating from these all unpitted cherries.

Hitherto workers inspecting articles by means of candling machines have been subject to eye strain because of the large amount of light to which their eyes are exposed besides the light present in the articles actually inspected. Another cause of this eye strain has been the fluctuation in the strength of the light applied to articles at various points in the zone of inspection throughout which the operator has to pay attention to these articles.

It is another object of my invention to provide an efficient candling machine which may be operated with a relative minimum of eye strain.

In the past candling machines have made use of incandescent lamps with incandescent filaments. I have found these largely ineffective in candling operations, first, due to their light concentration, necessitating having the lights a considerable distance from the object to be candled; and second, the resulting heat generated. This generated heat, of course, is due to the high wattage necessary in order to obtain sufficient foot candles of light which vary inversely as the square of the distance.

It is an object of my invention to provide a candling machine in which a relatively intense concentration of light may be made available and directed through the articles being candled without the production of an undue amount of heat, and in which this may be done in such a manner that the amount of light directed through each individual article will remain substantially constant while said article is traveling through an inspection zone.

It is a still further object of my invention to provide a candling machine in which the lamps may be quickly removed and replaced whenever this becomes necessary.

The manner of accomplishing the foregoing objects, as well as further objects and advantages, will be made manifest in the following description taken in connection with the accompanying drawings, in which:

Fig. 1 is a diagrammatic longitudinal cross sectional view of a preferred embodiment of the cherry candler of my invention.

Fig. 2 is an enlarged cross sectional view taken on the line 2—2 of Fig. 1, illustrating the construction of the light drawer of my invention, with this inserted into its place in the machine ready for operation.

Fig. 3 is a diagrammatic enlarged detail sectional view of a portion of Fig. 2 illustrating the operation of the candling machine of my invention when candling cherries.

Fig. 4 is a view similar to Fig. 2, showing the light drawer of my invention partly withdrawn as when changing lights in my invention.

Fig. 5 is a diagrammatic perspective view illustrating the manner in which the light drawer of my invention fits under the candling conveyer thereof.

Figure 6:
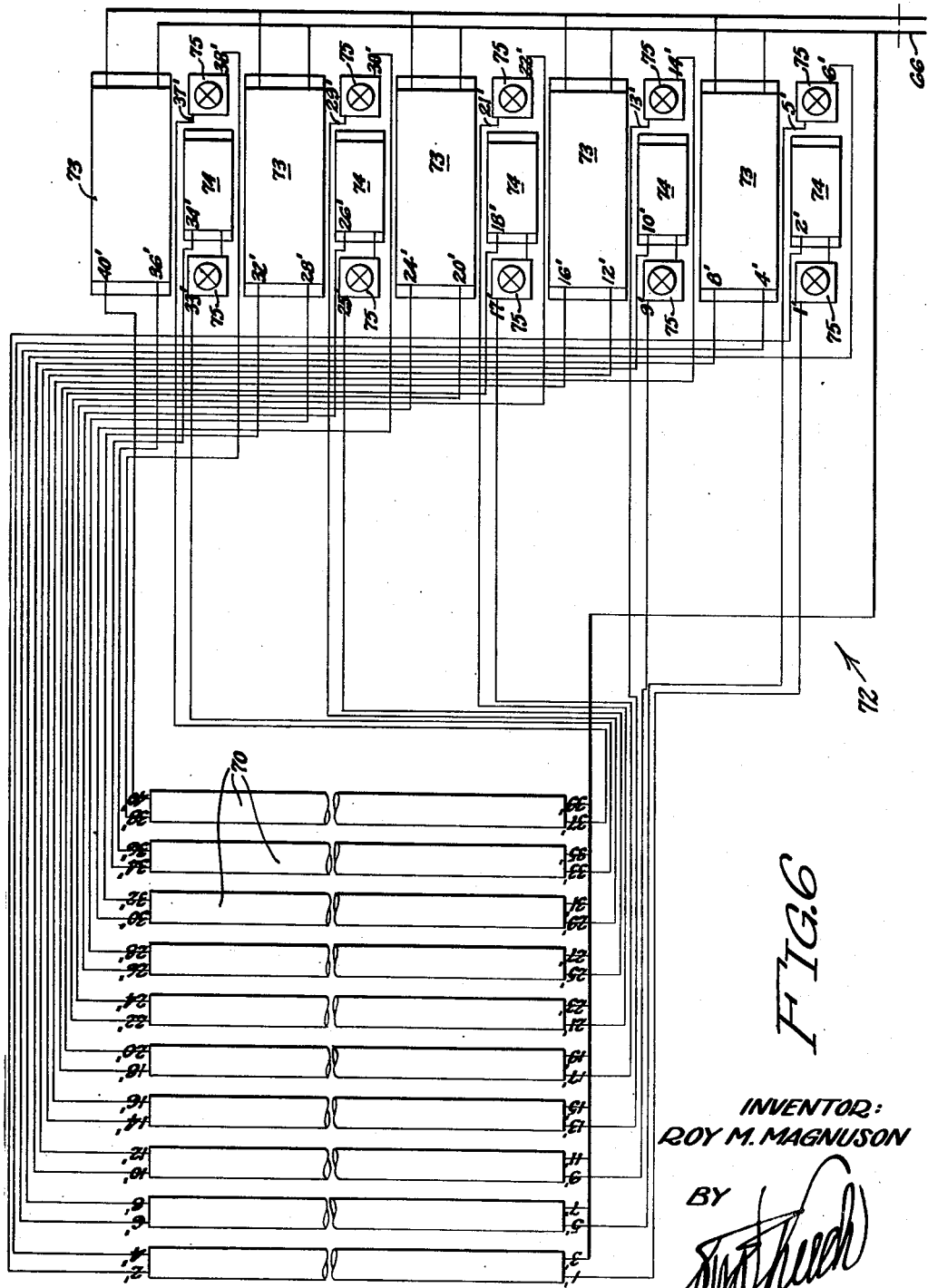
Fig. 6 is a wiring diagram illustrating the wiring system of the light drawer of my invention.

Referring specifically to the drawings, it is noted that the cherry candler 10 shown therein includes a frame 11 having side walls 12 which are supported on legs 13 and on which are journalled shafts 14, 15 and 16. These shafts have drums 17, 18 and 19 about which is trained a flexible conveyor belt 20, the latter including a flexible inner belt 21 which is preferably formed of rubber belting material and an endless series of slats 22 which are fixed as by riveting to the inner belt 21. Each of these slats 22 has a series of cherry cups 25 formed therein, a light hole 26 being bored centrally in each of these cups so as to extend all the way through this slat 22 and the inner belt 21 lying therebeneath.

Mounted on the frame 11 is a motor 30 which is connected by suitable transmission 31 to the shaft 16 so as to drive the conveyor 20 in the direction of the arrow 32.

A flight 35 of the conveyor 20 is supported by guide boards 36 provided on the side walls 12. A bottom board 37 lies across the lower portion of this flight and is fixed to the side walls so as to form a stemmed cherry bin 38 in which a quantity of stemmed cherries 39 is shown in Fig. 1. As the conveyor flight 35 travels upwardly these cherries are deposited in the cherry cups 25. Any excess of cherries carried upwardly on the conveyor flight is knocked back into the bin 38 by a cylindrical brush 45 which is rotated by a suitable transmission 46 connecting this brush with the shaft 15.

An upper flight 47 of the conveyor belt 20 lies horizontally, this flight of the conveyor carrying cherries through what will be referred to hereinafter as the inspection zone 50 of the invention. Adapted to be inserted through an opening 51 in one of the side walls 12 and supported on guide bars 52 extending between these walls so as to lie just beneath the upper belt flight 47 in the inspection zone 50 is a light unit 55 including a drawer 56. This drawer has front and rear walls 57 and 58 and end walls 59. A false bottom 60 horizontally divides the space in the drawer 56 and has the opposite edges thereof secured to walls 57 and 58.

Provided on the front wall 57 is a handle 65 and on the rear wall 58 is a plug 66 which, when the drawer is pushed into the machine, engages with a receptacle 67 mounted in one of the walls 12. Mounted on top of the floor 60 is a series of tubular flourescent electric lamps 70 which, when the drawer 56 is in place, as shown in Fig. 2, are aligned longitudinally and disposed directly below the longitudinal rows of holes 26 provided in the conveyor belt 20.

The terminals of the plug 66 are connected through a suitable wiring system 72 to the lamps 70. This system is shown in Fig. 6 and includes a group of five ballast units 73, five compensators 74 and ten starters 75 which are hooked up together and to the tubular lamps 70 in the manner indicated in the diagram of Fig. 6, and which is well known in the art. Reference characters 1' to 40' inclusive identify the conductors in this electric system.

When the drawer 56 is pushed into place, as shown in Fig. 2, the plug 66 makes an electrical connection with the socket 67, the latter being supplied with electricity by any suitable means. Thus, through the system 72 all of the lamps 70 are illuminated whenever the drawer 56 is pushed in.

Operation

The lamps 70 are thus illuminated during the operation of the cherry candler 10 of my invention.

One reason why I prefer that the tubular electric lamps 70 be of the incandescent gas or fluorescent type is that for the production of a given amount of illumination this type of lamp operates at a much lower surface temperature than the type of lamp employing an incandescent filament. The use of fluorescent tubular lamps therefore permits these lamps to be placed much closer to the articles to be candled and the conveyor on which these are carried without damage to the articles or the conveyor. It also permits illuminating to a much higher degree each of the articles being candled as this passes through the inspection zone.

The machine is preferably operated in the dark and the operator, which is usually a woman, stands so that she can see all of the cherries traveling through the inspection zone 50. The efficiency of the better cherry pitters is such that only about one cherry in a thousand fails to be pitted, but it is necessary that the operator of the candler 10 check every cherry so as to be certain that this one out of a thousand will be eliminated.

Because of the tubular lamps 70 being just below and in alignment with the longitudinal rows of holes 26, the light shining through each of the holes 26 and entering the cherry resting in the cup 25 immediately thereabove is uniform throughout the travel of this cherry through the inspection zone 50. There is thus no flickering of the light in the cherries as they travel through this zone. Moreover, no light leaks out into the range of vision of the operator other than that which is forced to pass through the cherries. The operator is thus able, without eye strain, to keep all the cherries traveling through the inspection zone within the range of her vision all the time. Working under these circumstances the operator views this parade of a band of cherries traveling through the zone of inspection and is able to note with keen discrimination, and without any difficulty, the exact degree to which the respective cherries transmit that amount of illumination which is uniformly and constantly delivered to all. This enables her to make an exceedingly close segregation of the articles candled on the basis of their respective capacities to transmit light. It is thus seen that the candler of my invention is not only well adapted to facilitate the detection of the presence of pits in bleached cherries, as is illustrated in Fig. 3, but it so enhances the capacity of the operator to exercise exact discrimination with ease in detecting undesirable variations in the articles being candled as to make large production possible in any kind of candling operation.

Another important feature of my invention is to be found in the mounting of the lamps 70 in the lamp unit 55. This permits the lamps to be located very close to the conveyor carrying the cherries and is facilitated by the placing of the drawer 56 so that the flexible conveyor belt 20 rests directly on this drawer when the latter is in assembled position in the machine, this being clearly shown in Figs. 2 and 5. Operation of the machine with the lamps 70 thus positioned results in particles of cherry meat and other debris being deposited on the lamps so that after a while it becomes necessary to clean this debris from these lamps in order to maintain the full operating efficiency of the machine. The drawer 56 makes it possible to quickly remove the lamps 70 for cleaning these.

Occasionally in the operation of the candler 10, one or more of the lamps 70 burns out, or else some other portion of the wiring system 72 fails and has to be repaired. Mounting the lamps 70 and the complete wiring system 72 on the drawer 56 makes it possible to reduce to an absolute minimum delays for this kind of repairs by providing an extra drawer 56 fully equipped with lamps and wiring system so that when it is necessary to remove one of these drawers for repair the spare drawer may be substituted immediately and the operation of the machine resumed.

While I have shown and described a single embodiment of my invention, it is to be understood that various changes and modifications might be made in this without departing from the spirit of the invention or the scope of the appended claims.

What I claim is:

1. In a candling machine, the combination of:

a frame; an endless flexible conveyor belt, said belt having formed therein longitudinal rows of candling cups adapted to receive articles to be candled and light apertures, each of said light apertures connecting with one of said cups; means on said frame for mounting said belt and causing a flight of said belt to travel along a given path to cause said cups to travel with said belt into an inspection zone in which the operator inspects the articles on said belt; a drawer removably received in said frame so that when in place said drawer lies just beneath the inspection zone; tubular electric lamps of the same length as said zone, one of said lamps being provided for each of said rows of apertures; and means for mounting said tubular lamps in said drawer parallel with and directly beneath the paths along which said rows of apertures travel when the latter pass through said inspection zone.

2. In a candling machine, the combination of: a frame; an endless flexible conveyor belt, said belt having formed therein longitudinal rows of candling cups adapted to receive articles to be candled and light apertures, each of said light apertures connecting with one of said cups; means on said frame for mounting said belt and causing a flight of said belt to travel along a given path to cause said cups to travel with said belt into an inspection zone in which the operator inspects the articles on said belt; a drawer removably received in said frame so that when in place said drawer lies just beneath the inspection zone; tubular electric lamps of the same length as said zone, one of said lamps being provided for each of said rows of apertures; means for mounting said tubular lamps on said drawer parallel with and directly beneath the paths along which said rows of apertures travel when the latter pass through said inspection zone; ballast, compensator and starter devices provided on said drawer sufficient for supplying said lamps with current; and quickly detachable means for supplying electric current to said ballast device.

3. In a candling machine, the combination of: a frame; an endless flexible conveyor belt, said belt having formed therein longitudinal rows of candling cups adapted to receive articles to be candled and light apertures, each of said light apertures connecting with one of said cups; means on said frame for mounting said belt and causing a flight of said belt to travel along a given path to cause said cups to travel with said belt into an inspection zone in which the operator inspects the articles on said belt; a drawer removably received in said frame so that when in place said drawer lies just beneath the inspection zone; tubular fluorescent electric lamps of the same length as said zone, one of said lamps being provided for each of said rows of apertures; means for mounting said tubular lamps on said drawer parallel with and directly beneath the paths along which said rows of apertures travel when the latter pass through said inspection zone; ballast, compensator and starter devices provided on said drawer sufficient for supplying said tubes with electric current; and plug connecting means for supplying said ballast devices with electric current, said means being automatically disconnected when said drawer is removed from said frame and connected when said drawer is inserted in its operative position in said frame.

4. In a candling machine, the combination of: a frame; an endless flexible conveyor belt, said belt having formed therein longitudinal rows of candling cups adapted to receive articles to be candled and light apertures, each of said light apertures connecting with one of said cups; means on said frame for mounting said belt and causing a flight of said belt to travel along a given path to cause said cups to travel with said belt into an inspection zone in which the operator inspects the articles on said belt; a drawer removably received in said frame so that when in place said drawer lies just beneath the inspection zone and supports that portion of said belt disposed in said zone; tubular electric lamps of the same length as said zone, one of said lamps being provided for each of said rows of apertures; and means for mounting said tubular lamps in said drawer parallel with and directly beneath the paths along which said rows of apertures travel when the latter pass through said inspection zone.

5. In a candling machine, the combination of: a frame; an endless flexible conveyor belt, said belt having formed therein longitudinal rows of candling cups adapted to receive articles to be candled and light apertures, each of said light apertures connecting with one of said cups; means on said frame for mounting said belt and causing a flight of said belt to travel along a given path to cause said cups to travel with said belt into an inspection zone in which the operator inspects the articles on said belt; a drawer removably received in said frame so that when in place said drawer lies just beneath the inspection zone; fluorescent tubular lamps of the same length as said zone, one of said lamps being provided for each of said rows of apertures; and means for mounting said tubular lamps in said drawer parallel with and directly beneath the paths along which said rows of apertures travel when the latter pass through said inspection zone.

6. In a candling machine, the combination of: a frame; an endless flexible conveyor belt, said belt having a series of longitudinal rows of light apertures; a series of slats disposed transversely of and secured to said belt, there being article receiving cups formed in each of said slats, each cup connecting with one of said light apertures; means on said frame for mounting said belt and causing a flight of said belt to travel along a given path to cause said cups to travel with said belt into an inspection zone in which the operator inspects the articles in said cups; a drawer removably received in said frame so that when in place said drawer lies just beneath the inspection zone and supports edge portions of said belt in said zone; tubular electric lamps of the same length as said zone, one of said lamps being provided for each of said rows of apertures; and means for mounting said tubular lamps in said drawer parallel with and directly beneath the paths along which said rows of apertures travel when the latter pass through said inspection zone.

ROY M. MAGNUSON.